United States Patent
Han et al.

(10) Patent No.: US 7,916,720 B2
(45) Date of Patent: Mar. 29, 2011

(54) SLAVE NETWORK INTERFACE CIRCUIT FOR IMPROVING PARALLELISM OF ON-CHIP NETWORK AND SYSTEM THEREOF

(75) Inventors: Jin-Ho Han, Daejon (KR); Han-Jin Cho, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 657 days.

(21) Appl. No.: 11/861,360

(22) Filed: Sep. 26, 2007

(65) Prior Publication Data

US 2008/0082621 A1    Apr. 3, 2008

(30) Foreign Application Priority Data

Sep. 29, 2006    (KR) .................. 10-2006-0096275

(51) Int. Cl.
 *H04L 12/28* (2006.01)
(52) U.S. Cl. .................. 370/389; 709/209; 709/250
(58) Field of Classification Search .................. 370/376
    See application file for complete search history.

(56) References Cited

U.S. PATENT DOCUMENTS

| 2003/0229741 | A1* | 12/2003 | Stuber et al. .................. 710/110 |
| 2005/0204084 | A1* | 9/2005 | Joe et al. .................. 710/113 |

FOREIGN PATENT DOCUMENTS

| KR | 1020040032376 | 4/2004 |
| KR | 102060067802 | 6/2006 |
| KR | 1020060071075 | 6/2006 |

OTHER PUBLICATIONS

Se-Joong Lee, et al: "An 800MHz Star-Connected On-Chip Network for Application to Systems on a Chip;" (*2003 IEEE International Solid-State Circuits Conference, Session 26, Embedded and Digital Systems, Paper 26.6*, pp. 1-2 2003).
Kangmin Lee, et al; "A Distributed Crossbar Switch Scheduler for On-Chip Networks;" (*CICC*, 2004).

\* cited by examiner

*Primary Examiner* — Donald L Mills
*Assistant Examiner* — Sai-Ming Chan
(74) *Attorney, Agent, or Firm* — Ladas & Parry LLP

(57) ABSTRACT

There is provided a slave network interface circuit for improving the parallelism of an On-Chip network, including: a MUX for selecting one of a Write Address inputted from the On-Chip network and a Read Address to read data from a slave module, which is inputted from a slave network interface (SNI) controller, in response to the control of the SNI controller and inputs the selected address to the slave module; and the SNI controller for controlling writing and reading data at the slave module and generating a Read Address to store data read from the slave module and to transfer to the On-Chip network.

19 Claims, 7 Drawing Sheets

SLAVE NETWORK INTERFACE CIRCUIT FOR IMPROVING PARALLELISM OF ON-CHIP NETWORK AND SYSTEM THEREOF

BACKGROUND OF THE INVENTION

1. Field of the Invention

The present invention relates to On-Chip network; and, more particularly, to a slave network interface circuit for improving the parallelism of an On-Chip network having a slave network interface at each slave module for improving the parallelism of data communication between master modules and slave modules, and a system thereof.

This work was supported by the Information Technology (IT) research and development program of the Korean Ministry of Information and Communication (MIC) and/or the Korean Institute for Information Technology Advancement (IITA) [2005-S-077-02, "Development of On-Chip Network Based SoC Platform"].

2. Description of Related Art

According to the development of a semiconductor fabricating technology, a system on chip (SoC) design was introduced. The SoC design is a technology for integrating a processor, a memory, and peripheral devices into a single chip. The goal of the SoC design is to make single chip to perform various functions by integrating verified intellectual properties (IP) in single chip. The IP generally stands for an intellectual property such as patent. In semiconductor field, the IP particularly means a semiconductor design module that is a functional block having an independent function and reusable in semiconductor integrated circuit design. For example, the IP is a hardware and/or software functional block for constituting the logic circuit of a semiconductor.

In SoC design, an On-Chip Network was introduced for data communication between IPs. The On-Chip Network has the same features of a computing network.

FIG. 1 is a block diagram illustrating an On-Chip Network where the present invention is applied. That is, FIG. 1 shows a typical On-Chip network having a switch.

As shown in FIG. 1, the On-Chip network includes a switch 10, OCN ports 20 each having an Up-sampler 21 and a down-sampler 22, and intellectual properties 30.

The switch 10 is a physical medium for receiving data from one IP through one OCN port and transferring the received data to the other IP through another OCN port. The up-sampler 21 of the OCN port 20 sequentially transfers data inputted from one IP to a switch. The down-sampler 22 of the OCN port 20 de-sequantializes data inputted from the switch and transfers the de-sequantialized data to the other IP.

Each of the IPs 30 is a circuit designed based on a protocol defined for the On-Chip network thereof. The IPs 30 are classified into master modules and slave modules according to the operating feature thereof in a chip.

As described above, the goal of On-Chip network is to enable IPs such as master modules and slave modules to communicate to each others in parallel. As shown in FIG. 1, the switch 10 is disposed to make them communicate in parallel.

FIG. 2 is a block diagram illustrating a switch of FIG. 1.

As shown in FIG. 2, the switch 10 of an On-Chip network includes an in-port 11, an arbiter 12, and a switch fabric 13.

The in-port 11 queues data inputted to the switch and requests the arbiter 12 to use the switch fabric 13. The arbiter 12 receives the request from the in-port 11 and gives a permission to use the switch fabric 13. The switch fabric 13 outputs data inputted from the in-port 11.

The On-Chip network enables a plurality of IPs to use the On-Chip network at the same time. That is, the switch of the On-Chip network decodes a tag included in data inputted from each IP, for example, a packet, and sequentially transfers the decoded data to a corresponding destination, a target IP. It will be described in more detail hereinafter.

The switch distributes data received from one IP over the On-Chip network in a unit of a packet although the received data is small or large. Also, the switch decodes the tag of each data to sequentially transfer the data to each destination although the data are distributed over the network. The tag of each data is a parameter indicating the origin and the destination of data.

Referring to FIG. 2, the switch receives a plurality of data having various destinations from different IPs through the in-port, and transfers the received data to corresponding destinations through the switch fabric according to the permission from the arbiter to use the switch fabric.

Conventionally, the arbiter accepts the request of the in-port and transfers data queued in the in-port to the switch fabric if the switch fabric is empty. That is, if the data transfer requests are received as many as the number of the arbiters as shown in FIG. 2, the corresponding number of data can be transferred to a destination thereof.

But, if only one master module is used like a conventional method which is a bus, the other slave modules must wait to use the On-Chip network until the master module finishes the communication with one slave module. Also, the other slave modules must wait for such a long time to transfer data to a corresponding destination although the other slave modules need transfer the small amount of data.

Such a solution degrades the data transmission parallelism rather than improves the data transmission parallelism on the On-Chip network. In order to improve the usability of the On-Chip network, it is better to distribute the data transmission operations to the other master modules or/and slave modules rather than concentrates the data transmission operations to one master module.

Therefore, it has been required to dispose a module in a slave module to improve the data communication parallelism between IPs on an On-Chip network and to reduce the concentration rate of using master modules in a circuit having less master modules and a plurality of slave modules.

SUMMARY OF THE INVENTION

An embodiment of the present invention is directed to providing a slave network interface circuit for improving the parallelism of an On-Chip network by disposing a slave network interface (SNI) at a slave module side for improving the parallelism of data communication between intellectual properties, masters and slaves, and a system thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a slave network interface circuit for improving the parallelism of an On-Chip network, including: a MUX for selecting one of a Write Address inputted from the On-Chip network and a Read Address to read data from a slave module, which is inputted from a slave network interface (SNI) controller, in response to the control of the SNI controller and inputs the selected address to the slave module; and the SNI controller for controlling writing and reading data at the slave module and generating a Read Address to store data read from the slave module and to transfer to the On-Chip network.

In accordance with another aspect of the present invention, there is provided a slave network interface system for improving parallelism of an On-Chip network, including: a system controller for setting internal registers in a memory controller and at least one of slave network interfaces in an On-Chip Network; the memory controller for controlling a memory for storing data; and at least one of the slave network interfaces disposed at each of the slave modules in the On-Chip network, having internal registers set by the system controller to set a data transmission scheme of a corresponding slave module, and interfacing between a corresponding slave module and an On-Chip network for data transmission.

DESCRIPTION OF SPECIFIC EMBODIMENTS

The advantages, features and aspects of the invention will become apparent from the following description of the embodiments with reference to the accompanying drawings, which is set forth hereinafter.

The present invention relates a slave network interface circuit for preventing data transmission operations from being concentrated to a predetermined master module such as a DRAM controller and improving the data communication parallelism between a master module and a slave module and between slave modules by disposing a slave network interface (SNI) at a slave module without a typical On-Chip network structure changed.

In other words, the slave network interface circuit according to an embodiment of the present invention minimizes operations for high capacity data communication between slave modules, which are performed through a DRAM controller. Particularly, the slave network interface circuit according to an embodiment of the present invention does not include a direct memory access control (DMAC) for controlling high capacity data communication between a dynamic random access memory (DRAM) and an internal memory.

Hereinafter, a slave network interface circuit according to an embodiment of the present invention will be described with reference FIGS. 3 to 7.

Figure 1:
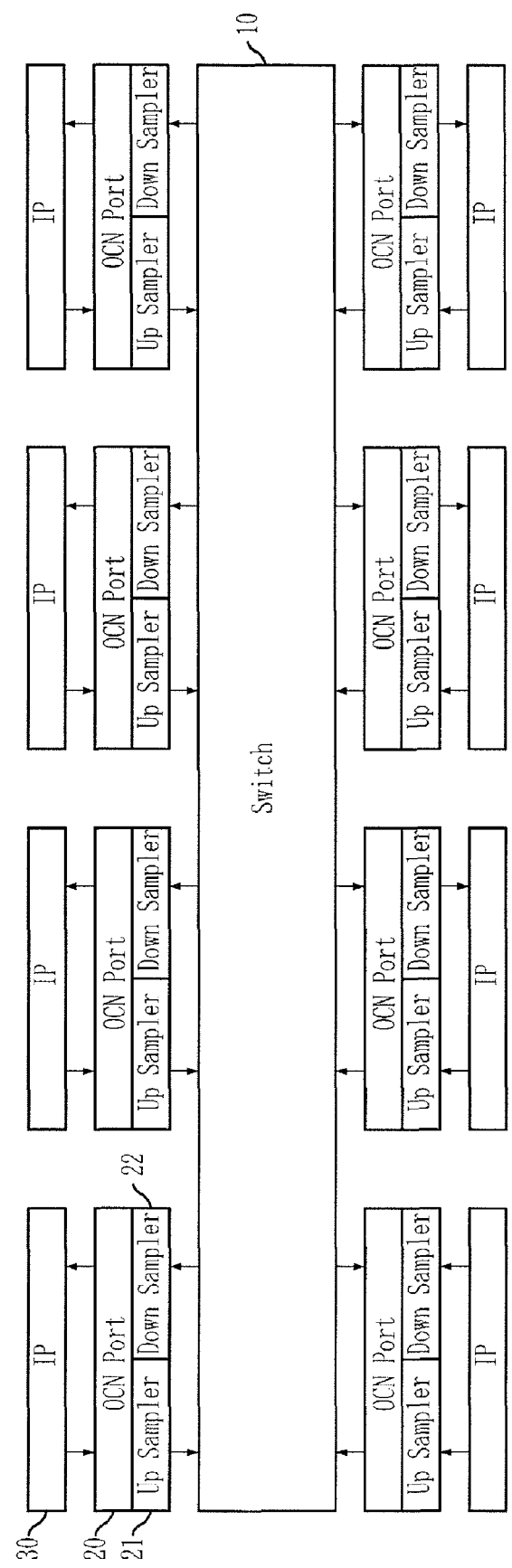
FIG. 1 is a block diagram illustrating an On-Chip Network where the present invention is applied.
Figure 2:
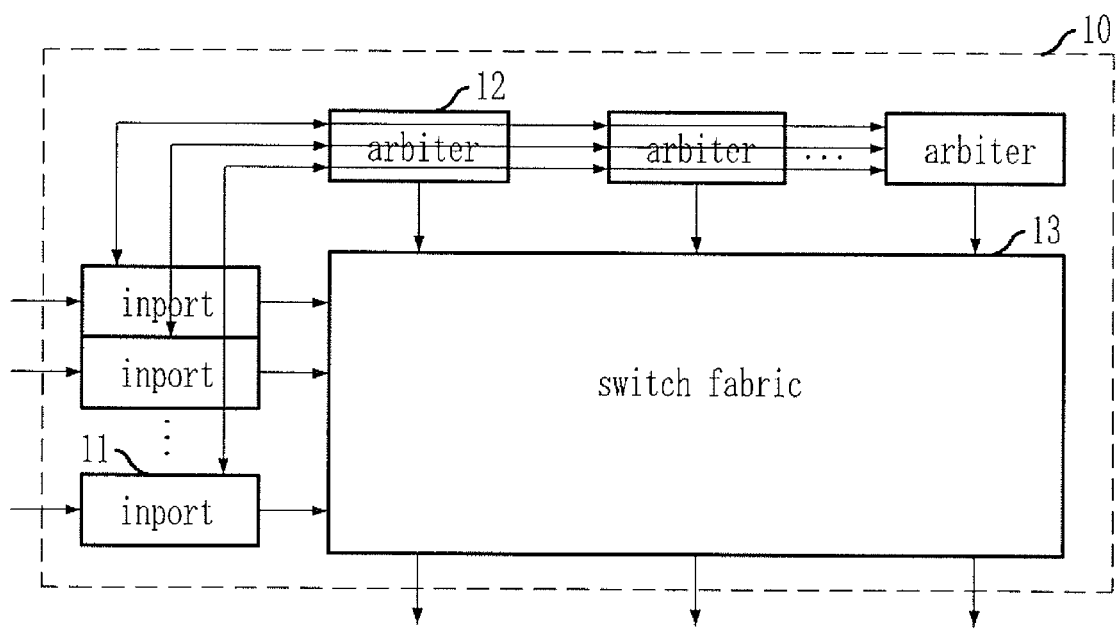
FIG. 2 is a block diagram depicting a switch of FIG. 1.
Figure 3:
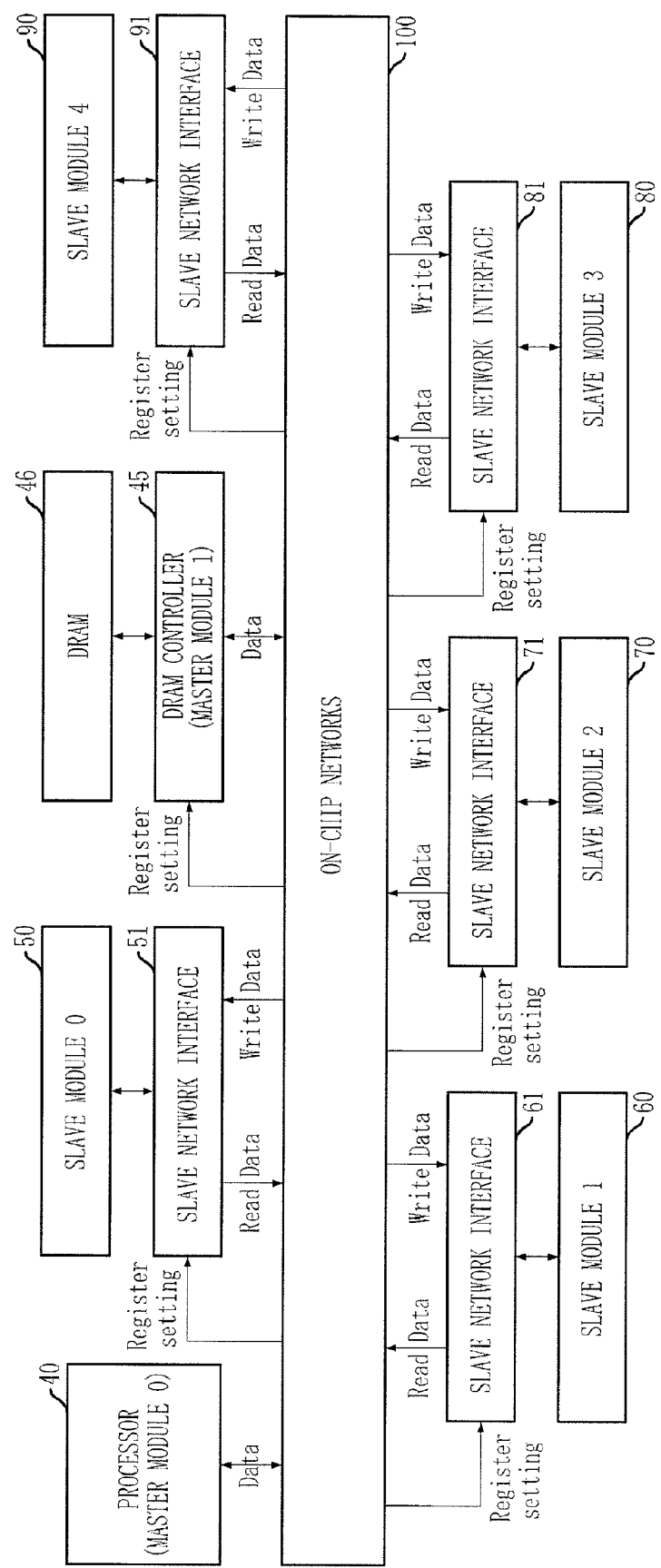
FIG. 3 is a block diagram showing an On-Chip network having a slave network interface in accordance with an embodiment of the present invention.

FIG. 3 is a block diagram illustrating an On-Chip network having a slave network interface in accordance with an embodiment of the present invention.

Referring to Fig.3, slave network interfaces (SNI) 51, 61, 71, 81, and 91 are disposed at between an On-Chip network 100 and one of first to fourth slave modules 60, 70, 80, and 90. Preferably, the SNI is disposed at the end of each slave module.

As shown in FIG. 3, the On-Chip network 100 includes two master modules, the first master module 40 as a processor for system control and the second module 45 as a DRAM controller for controlling the access of a DRAM, and a dynamic random access memory (DRAM) 46 for storing data. Although the On-Chip network 100 includes the processors and the DRAM controller as the master modules, the present invention is not limited thereto. Other master modules having different functions can be included in the On-Chip network 100.

The processor 40, the DRAM controller 45, and the slave modules 50, 60, 70, 80, and 90 exchange data through the On-Chip network 100 shown in FIG. 3.

The DRAM controller 45 transforms a signal inputted from the On-Chip network 100 to a signal that can be read by the DRAM 46, for example, to a DRAM interface signal.

The processor 40 sets a data transmission scheme suitable to the register setting of the DRAM 46 by setting the internal register of the DRAM controller 45.

Particularly, the slave network interfaces 51, 61, 71, 81, and 91 set the data transmission schemes of the slave modules 50, 60, 70, 80, and 90 through the internal register setting of the processor 40, read data recorded in the slave modules 50, 60, 70, 80, and 90, and transfer the corresponding data to the On-Chip network 100. The corresponding data inputs to master modules or slave modules corresponding to the destinations of corresponding data.

Hereinafter, the slave network interface shown in FIG. 3 will be described in detail with reference FIG. 4.

Figure 4:
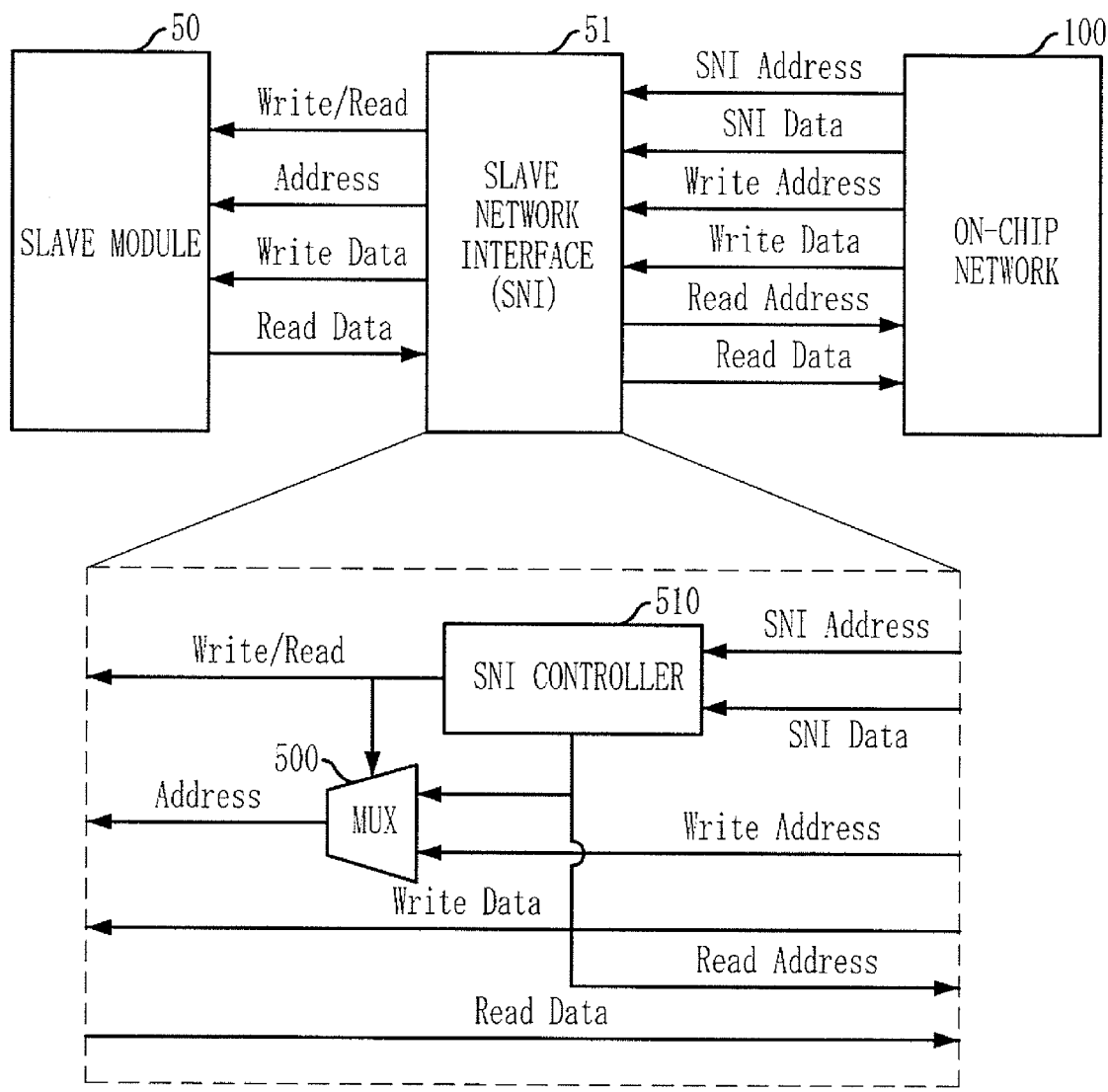
FIG. 4 is a block diagram of a slave network interface in accordance with an embodiment of the present invention.

FIG. 4 is a block diagram illustrating a slave network interface in accordance with an embodiment of the present invention.

Referring to FIG. 4, the slave network interface 51 is disposed for the data communication between the slave module 50 and the On-Chip network 100. The slave network interface 51 interfaces using a structure similar to the interface of a static random access memory (SRAM) having an uni-directional data port, for example, a write/read signal, address signal, write data and read data.

The slave network interface 51 uses a SNI Address signal, a SNI Data signal, a Write Address signal, a Read Address signal, and a Read Data signal between the On-Chip network for interfacing the slave module and the On-Chip network.

The slave network interface 51 uses the SNI Address Control signal and the SNI Data signal to input the internal register setting information of the processor 40 into the slave network interface 51, uses the Write Address signal and the Write Data signal to record data at the slave module 50 and to receive the address to write, and uses the Read Address signal and the Read Data signal to transfer the read data from the slave module 50 and the address thereof to the On-Chip network 100.

As shown in FIG. 4, the slave network interface 51 includes a MUX 500 and a SNI controller 510.

The MUX 500 selects one of the write address, which is received from the On-Chip network 100, and the read address to read data from the slave module 50, which is received from the SNI controller 510, in response to the SNI controller 410 and inputs the selected address to the slave module 50.

The SNI controller 510 decides one of addresses to select at the MUX 500 and controls the slave module 50 to read data or to write data. Also, the SNI controller 510 generates an address to store data read from the slave module 50 in order to transfer the read data to the On-Chip network 100.

The slave network interface 51 needs additional control signals to control the transmission and the receipt of data in order to interface between the slave module 50 and the On-Chip network 100 as described above. Hereinafter, such a need will be described with reference to FIG. 5.

Figure 5:
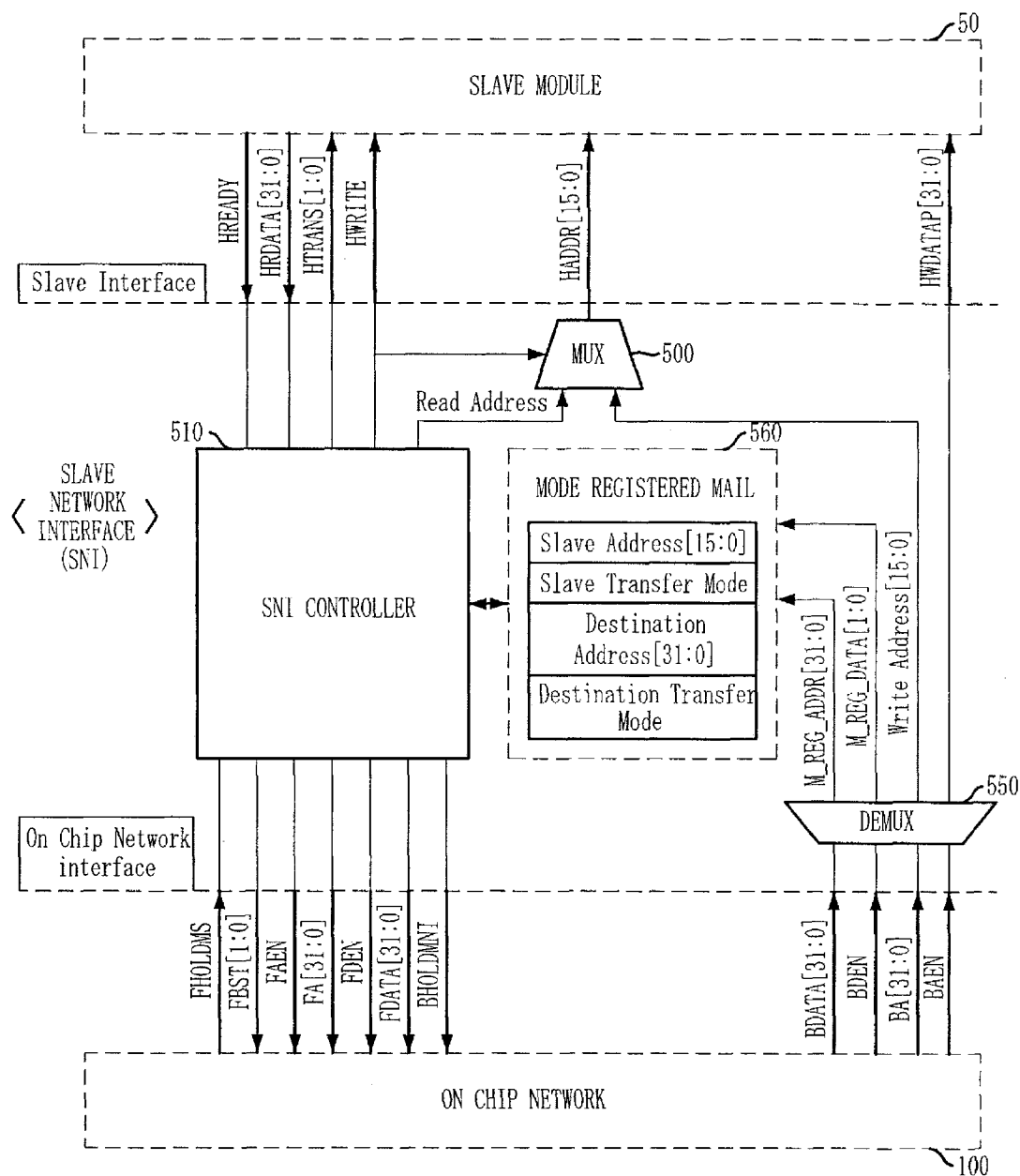
FIG. 5 is a circuit diagram illustrating a slave network interface of FIG. 4.

FIG. 5 is a circuit diagram illustrating a slave network interface of FIG. 4.

As shown in FIG. 5, the slave network interface 51 and the slave module 50 are connected to each other through an AMBA high performance bus (AHB) of advanced microcontroller bus architecture (AMBA) 20.

In order to perform the data communication between the slave network interface 51 and the On-Chip network 100, a forward path signal and a backward path signal are used. The forward path signal is used to transfer data from the slave network interface 51 to the On-Chip network 100. The backward path signal is used to transfer data from the On-Chip network 100 to the slave network interface 51.

Hereinafter, the On-Chip network interface signals, the forward path signal, the backward path signal, and the slave module interface signal, which are shown in FIG. 5 will be described in detail.

The forward path signal includes signals of FHOLDMS, FBST, FAEN, FA, FDEN, and FDATA.

The FHOLDMS signal is a signal transmitted from the On-Chip network 100 to the slave network interface 51 for interrupting the transmission of data received through the forward path.

The FBST signal is a signal for transmitting a burst length from the slave network interface 51 to the On-Chip network 100 in order to operate in a burst mode.

The FAEN signal indicates that a FA signal is valid, which is transmitted from the slave network interface 51 to the On-Chip network 100.

The FA signal indicates an address to store data.

The FDEN signal is transmitted from the slave network 51 to the On-Chip network 100 for indicating that the FDATA signal is valid.

The FDATA signal is transmitted from the slave network interface 51 to the On-Chip network 100 for indicating data to store.

The backward path signal includes the signals of BHOLDMNI, BAEN, BA, BDEN, and BDATA.

The BHOLDMNI signal is transmitted from the slave network interface 51 to the On-Chip network 100 for interrupting the transmission of data received through the backward path.

The BAEN signal is transmitted from the On-Chip network 100 to the slave network interface for indicating that a BA signal is valid.

The BA signal denotes an address to store data.

The BDEN signal is transmitted from the On-Chip network 100 to the slave network interface 51 for indicating that the BDATA signal is valid.

The BDATA signal is transmitted from the On-Chip network 100 to the slave network interface 51.

Finally, the slave module interface signal includes the signals of HREADY, HRDATA, HTRANS, HWRITE, HADDR, and HWDATA.

The HREADY signal is used to inform the slave network interface 51 that the slave module 50 is not busy or that the signal HRDATA is valid. For informing that, the signal HREADY has a value of '1'.

The HRDATA signal indicates data read from the slave module.

The HTRANS signal indicates an AMBA transmission mode. The HTRANS signal having the value of '00' denotes an idle mode, the HTRANS signal having the value of '01' denotes a busy mode, the HTRANS signal having the value of '10' denotes a Non-sequential mode, and the HTRANS signal having the value of '11' denotes a sequential mode.

The HWRITE signal is used to write data at the slave module 50 or to read data from the slave module 50. The HWRITE signal having a value of '1' is used to write data at the slave module 50. The HWRITE signal having a value of '0' is used to read data.

The HADDR signal indicates an address to record data and an address to read data.

The HWDATA signal indicates data to store in the slave module 50.

The slave network interface 51, which enables the slave module 50 to communicate with the On-Chip network 100 using the interface signals including the forward path signal, the backward path signal, and the slave module interface signal, includes a MUX 500, a SNI controller 510, a DEMUX 550, and a mode register 560.

The slave network interface 51 having the MUX 500 and the SNI controller 510 were described with reference to FIG. 4. However, it is preferable that the slave network interface 51 further include the DEMUX 550 and the mode register 560 for effectively performing the data transmission, for example, for controlling the signals of the slave network interface and the On-Chip network, which are inputted and outputted from or to the MUX 500 and the SNI controller 510. Hereinafter, the DEMUX 550 and the mode register 560 will be described in detail.

The DEMUX 550 receives data from the On-Chip network 100 through a backward path and determines whether the received data is outputted to the mode register 560 or to the MUX 500 and the slave module 50.

For example, if a backward path address corresponding to the received data indicates a mode register address, the DEMUX 550 outputs the received data to the mode register 560 as an M_REG_DATA signal. Among the address, a mode register index part is outputted to the mode register 560 as an M_REG_ADDR signal.

If the backward path address does not indicate the mode register address, the DEMUX 550 recognizes the received data as data to be stored in the data slave module 50, outputs the lower 16 bits of the address to the MUX 500 as a Write Address signal and outputs the received data to the slave module 50 as an HWDATA signal.

After the MUX 500 receives a Read Address signal from the SNI controller 510 and a Write Address signal from the DEMUX 550, if the MUX 500 receives an HWRITE signal having the value of '0' from the SNI controller 510, the MUX 500 outputs the Read Address signal, which is for storing HRDATA, to the slave module 50 as the HADDR signal. If the MUX 500 receives an HWRITE signal having the value of '1' from the SNI controller 510, the MUX 500 outputs the Write Address to the slave module 50 as an an HADDR signal.

The mode register 560 stores information about a transmission scheme to transmit data at the SNI controller 510. The SNI controller 510 controls the transmission and receipt of data using a corresponding transmission mode based on the information stored in the mode register 560.

Before the data communication procedure between the slave network interface 51 and the On-Chip network 100 and the data communication procedure between the slave network interface 51 and the slave module 50 will be described, a transmission mode will be described in detail with reference to FIG. 6, hereinafter.

Figure 6:
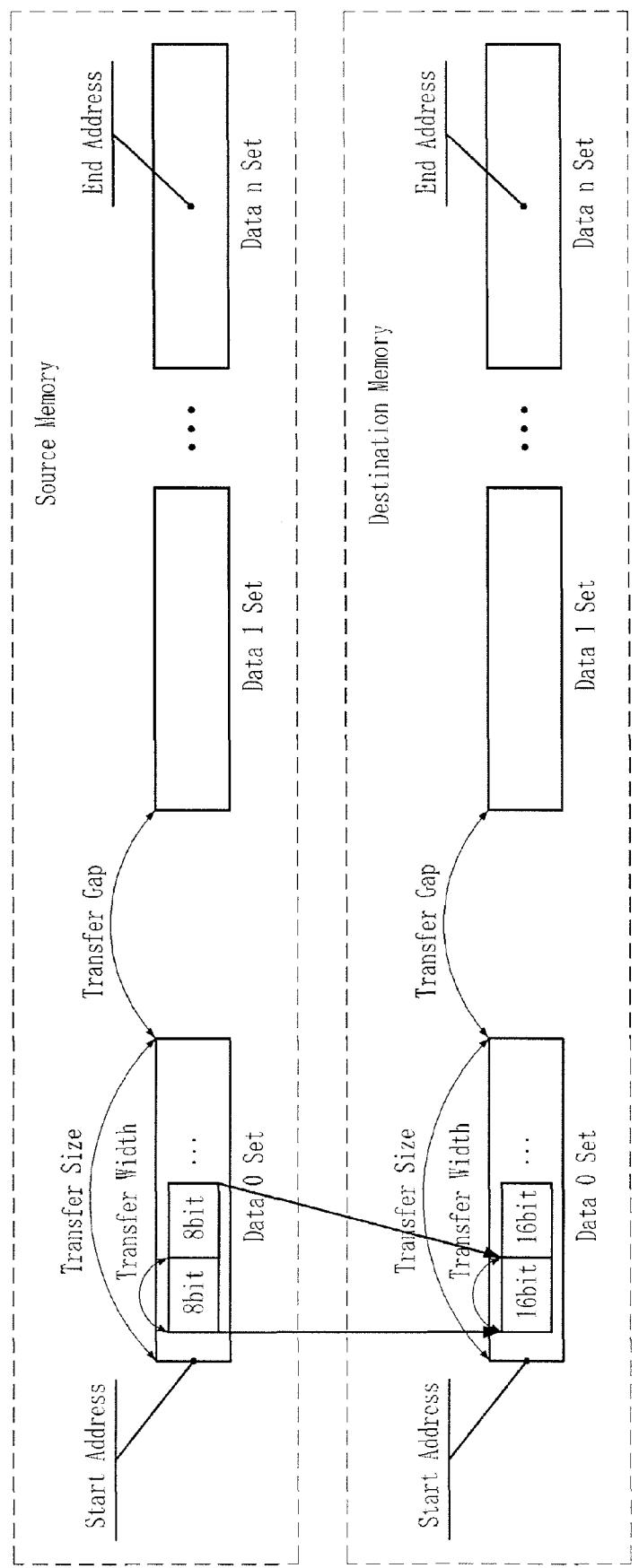
FIG. 6 is a block diagram showing the transmission mode of a slave network interface in accordance with an embodiment of the present invention.

FIG. 6 is a block diagram illustrating the transmission mode of a slave network interface in accordance with an embodiment of the present invention.

FIG. 6 shows a transmission mode for a slave network interface that reads data from a slave module and transmits the read data to one of IPs, a master module and a slave module, on an On-Chip network.

The data unit of a slave module to transmit may be 8-bit, 16-bit, . . . , 128-bit. The data to transmit may be a set of a plurality of consecutive data, or the consecutive data set may be separated as far as a predetermined address distance.

Meanwhile, the data unit of a predetermined IP to store may be different from the data unit of the slave module. The number of consecutive data and the address distance of separating the sets of the consecutive data may be different from that of the slave module.

As shown in FIG. 6, the memory of a slave module stores consecutive data sets each formed of 8-bit data units and repeated with a predetermined address distance separated. On the contrary, the memory of a destination module stores consecutive data sets each formed of 16-bit data units and repeated with another predetermined address distance separated.

The source memory shown in an upper part of FIG. 6 denotes a memory of a slave module for storing data. A Start Address of the source memory denotes a start address to read data, a transfer size means the number of consecutive data, and a transfer gap means an address distance between consecutive data. An End Address of a source memory denotes the last address to read data.

The destination memory shown in a lower part of FIG. 6 is the memory of a predetermined IP to store data read from a slave module. Like the structure of the source memory, the destination memory has the data storing structure of a Start Address, a Transfer Size, a Transfer Gap, and an End Address.

The above described information is stored in the mode register shown in FIG. 5 as follows.

```
* Source Memory
    M_REG0th = {16'b0, StartAddress[15:0]}
    M_REG1th  =  {TransferWidth[2:0],  TransferSize[4:0],
TransferGap[7:0], EndAddress[15:0]}
* Destination Memory
    M_REG2th = {StartAddress[31:0]}
    M_REG3th  =  {TransferWidth[2:0],  TransferSize[4:0],
TransferGap[7:0], IncreasedAddress[15:0]}
```

The slave network interface shown in FIG. 5, preferably the SNI controller, stores data inputted from the On-Chip Network in a slave module by analyzing a backward path signal. Or the slave network interface read data from the slave module by controlling information stored in the mode register. That is, the slave network interface read data by slave module interface signals according to a transmission mode and generates a forward path signal in order to transfer the data to the On-Chip network.

Hereinafter, a procedure for transmitting data at a slave network interface, that is, a procedure for storing data at a slave module and a procedure for transmitting data to an On-Chip network with reference to the signals shown in FIG. 5.

At first, the procedure of storing data at a slave module will be described as follow.

If a BAEN signal inputted from an On-Chip network has a value of '0', the slave network interface stands for performing the data storing procedure. If a BAEN signal inputted from an On-Chip network has a value of '1', the slave network interface starts the data storing procedure.

Then, if the slave network interface receives an HREADY signal having the value of '0', the slave network interface generates the BHOLDMNI signal having the value of '1', transmits the generated BHOLDMNI signal to the On-Chip network, and waits. If the slave network interface receives the HREADY signal having the value of '1', the slave network interface transits the HTRANS signal from the Idle mode to the Non-sequential mode.

Then, the slave network interface sets the value of the HWRITE signal to '1'. At this time, the value of the HADDR signal changes corresponding to the Write Address signal.

If the slave network interface receives the BAEN signal having the value of '0' at the second time from the On-Chip network, the slave network interface continuously waits for performing the data storing procedure. If the slave network interface continuously receives the BAEN signal having the value of '0' at the next time, the slave network interface transits the HTRANS signal to the Idle mode, and does not perform the data storing procedure in the slave module anymore.

Then, if the value of the HREADY signal becomes '0' after The BAEN signal value transits to '1', the slave network interface changes the value of the BHOLDMNI signal to '1' and waits. If the value of the HREADY signal becomes '1', the slave network interface performs a transmission mode transit operation. That is, the slave network interface transits the HTRANS signal from the Non-sequential mode to a sequential mode.

As described above, the slave network interface does not store data at a slave module anymore by transiting a sequential mode to an Idle mode while waiting or starting the data storing procedure according to the value of the BAEN signal that is continuously inputted from the On-Chip network. If the values of the BAEN signal and the HREADY signal change, the slave network interface performs the data storing procedure by setting the transmission mode as the sequential mode.

Hereinafter, a procedure of transmitting data from a slave network interface to an On-Chip network will be described.

At first, the slave network interface read information about a transmission mode stored in a mode register.

If the slave network interface receives the FHOLDMS signal having the value of '0' from the On-Chip network, the slave network interface stands for performing the data transmission procedure. If the slave network interface receives the FHOLDMS signal having the value of '0' from the On-Chip network, the slave network interface starts the data transmission procedure.

Then, the slave network interface receives the HREADY signal having the value of '0', the slave network interface changes the value of the BHOLDMNI signal to '1', transmits the BHOLDMNI signal to the On-Chip network, and waits. If the slave network interface receives the HREADY signal having the value of '1', the slave network interface generates a Read Address that is the address of data read from the slave module according to the transmission mode read from the mode register.

Then, the slave network interface changes the value of the HWRITE signal to '0', transmits the HWRITE signal to a slave module, and transits the HTRANS signal from the Idle mode to the Non-sequential mode.

Then, if the value of the HREADY signal inputted from the slave module transits from '0' to '1', the slave network interface reads the HRDATA signal from a slave module and stores the HRDATA signal in the SNI controller, for example, an internal buffer.

Then, the slave network interface generates FDATA as a FBST signal and a FA signal corresponding to data read from the HRDATA signal stored in the SNI controller according to the transmission mode.

Then, the slave network interface changes the values of the FAEN signal and the FDEN signal from '0' to '1' and changes them to '0' again.

And, the slave network interface generates a Read Address which is an address of data to read from a slave module according to the transmission mode.

And, the slave network interface transits the Nonsequential mode to the sequential mode.

If the HREADY signal transits to '0' and backs to the slave network interface reads the HRDATA signal and generates a FDATA signal.

If the FDEN signal transits from '0' to '1' and transits back to '0' again, the slave network interface generates the value thereof.

As described above, the operation for generating a Read Address, the operation for transiting the Non-sequential mode to the sequential mode, the operation for generating the FDATA signal by reading the HRDATA signal when the HREADY signal has the value of '1', and the operation for transiting the FDEN signal from '0' to '1' and to '0' again, are repeatedly performed. After the data transmission is finished, the data transmitting procedure ends.

The slave network interface according to the present embodiment has following advantages. The slave network interface according to the present embodiment enables data exchange between memories having different data units by dividing or combining data and performing a 2D Block transmission and also enables a plurality of slave modules to transmit and receive data at the same time by disposing the slave network interfaces at corresponding slave modules.

The conventional data transmission scheme having a DMAC only allows one master module to perform data transmission although the communication structure changes from a bus to an On-Chip network. Therefore, it can be communicated with a slave module using one of a DMAC and a processor only according to the conventional method. However, the slave network interface according to the present embodiment enables a plurality of slave modules to communicate at the same time. Furthermore, the circuit structure thereof becomes simpler because it is only required to support one-directional channel for exchanging data between a slave module and an On-Chip network using one-directional signal and to support the memory region of a slave module.

Since the slave network interface requires the slave module to employ a generalized specification, AMBA 2.0, and the slave network interface according to the present embodiment can be directly connected to an On-Chip network, a signal transforming circuit is not needed between AMBA 2.0 and the On-Chip network and a data transmission latency caused by the signal transforming circuit is removed according to the present embodiment.

In the present embodiment, it is not necessary to transform signals between the slave module and the On-Chip network because the slave network interface is disposed at the slave module.

Figure 7:
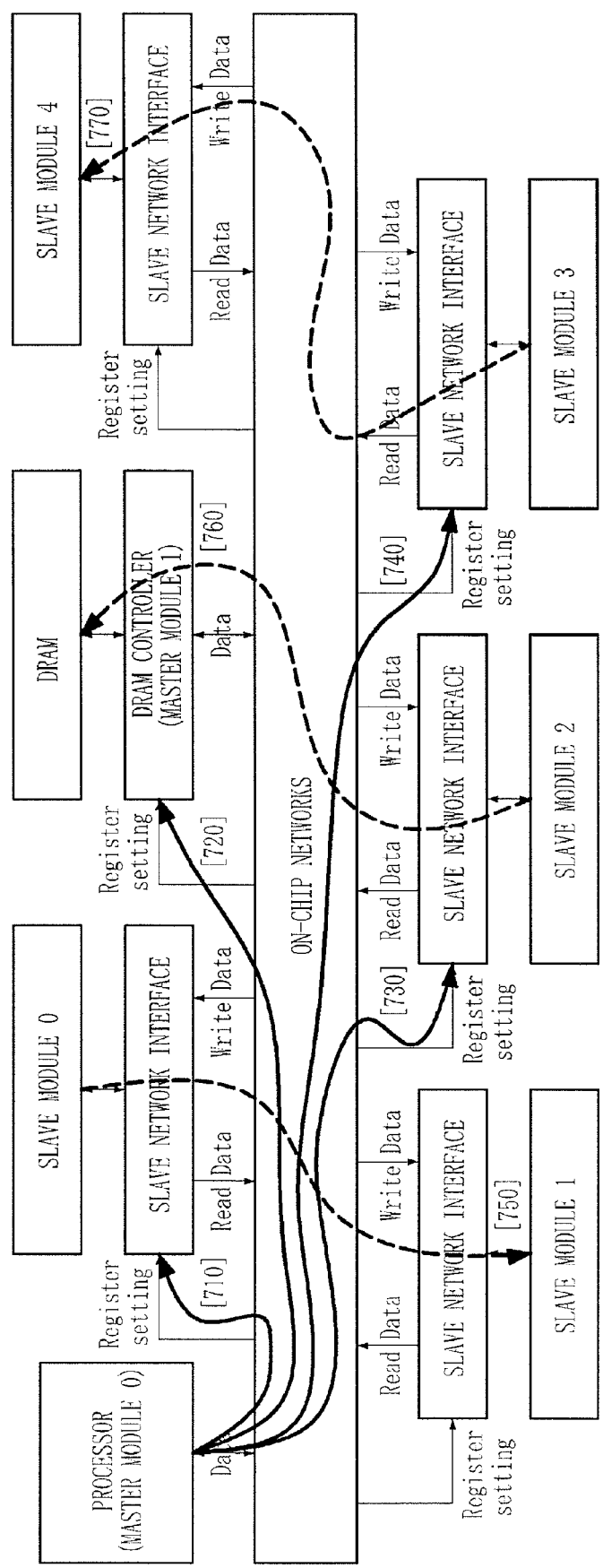
FIG. 7 is a diagram for describing data communication through a slave network interface in accordance with an embodiment of the present invention.

FIG. 7 is a diagram for describing data communication through a slave network interface in accordance with an embodiment of the present invention.

In FIG. 7, a data communication procedure between a DRAM controller and a slave module, and a data communication procedure between slave modules are briefly described. Hereinafter, the data transmission procedure thereof will be described. Generally, a programmable logic is used to set a memory controller, for example, a DRAM controller. In the present embodiment, a processor is used to set the DRAM controller instead of the programmable logic.

Hereinafter, a procedure of setting a slave network interface will be described.

At step [710], a processor 40 sets a source address for an address to read data from a slave module 50 and an address to transmit data, a destination address, and each transfer mode at a slave network interface 51 of the first slave module 50.

At step [720], the processor 40 sets the characteristics and the communication mode of the DRAM 46, such as a refresh time, a burst length, and a cas latency.

At step [730], the processor 40 sets a source address for an address to read data from a slave module 70 and an address to transmit data, a destination address, and each transfer mode at a slave network interface 71 of the third slave module 70.

At step [740], the processor 40 sets a source address for an address to read data from a slave module 80 and an address to transmit data, a destination address, and each transfer mode at a slave network interface 81 of the fourth slave module 80.

After the slave network interface is completely set through the steps [710], [720], [730], and [740], the data transmission is performed as follows.

The first slave module 50 transmits data to the second slave module 60 at step [750], and the third slave module 70 simultaneously transmits data to the DRAM 46 at step [760]. At the same time, the forth slave module 80 transmits data to the fifth slave module 90 at step [770].

As shown in the steps [750], [760], and [770], three data can be transmitted on the On-Chip network in parallel according to the present embodiment.

It is possible to simultaneously transmit further more data in parallel by increasing the number of ports in the On-Chip network. In the slave network interface according to the present embodiment, cycles for transmitting the same data are reduced by 44% compared to the conventional method using DMAC that consecutively transmits 16 words as many as slave modules.

The present application contains subject matter related to Korean patent application No. KR 2003-0093207, filed in the Korean patent office on Dec. 18, 2003, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

As described above, the slave network interface according to an embodiment of the present invention improve the data communication parallelism between the IPs on the On-Chip network. Also, the slave network interface according to an embodiment of the present invention reduces the concentration rate of using a master module in a typical On-Chip network having the less number of master modules and a plurality of slave modules.

The slave network interface according to an embodiment of the present invention enables data exchange between memories having different data units by dividing or combining data and performing a 2D Block transmission and also enables a plurality of slave modules to transmit and receive data at the same time by disposing the slave network interfaces at corresponding slave modules.

Furthermore, the circuit structure thereof becomes simpler because it is only required to support one-directional channel for exchanging data between a slave module and an On-Chip network using one-directional signal and to support the memory region of a slave module.

Since the slave network interface according to an embodiment of the present invention requires the slave module to employ a generalized specification, AMBA 2.0, and can be directly connected to an On-Chip network, the slave network interface according to an embodiment does not need a signal transforming circuit between AMBA 2.0 and the On-Chip network and can eliminate a data transmission latency caused by the signal transforming circuit.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

What is claimed is:

1. A slave network interface circuit for improving the parallelism of an On-Chip network, comprising:
    a MUX for selecting a Write Address inputted from the On-Chip network and a Read Address to read data from a slave module of a plurality of slave modules, which is inputted from a slave network interface (SNI) controller, in response to the control of the SNI controller and inputting the selected address to the anyone slave module; and
    the SNI controller for controlling writing and reading data at the slave module and generating a Read Address to store data read from the slave module and to transfer to the On-Chip network;
    wherein the slave network interface circuit transmits and receives data through a slave module interface signal, which is defined at an On-Chip network, between the slave modules, and transmits and receives the data through a forward path signal, which is transmitted from a slave network interface to the on-Chip network, and a backward paths signal, which is transmitted from the On-Chip network to the slave network interface, between the On-Chip network;
    the forward path signal includes a FHOLDMS signal, a FBST signal, a FAEN signal, a FA signal, a FDEN signal, and a FDATA signal; and
    the FHOLDMS signal is a signal for stopping transmission of data received through a forward path, the FBST signal is a signal for operating as a burst mode, the FAEN signal is a signal informing that the FA signal is valid, the FA signal denotes an address to store data, the FDEN signal denotes that the FDATA signal is valid, and the FDATA signal denotes data to be transmitted and stored from the slave network interface to the On-Chip network.

2. The slave network interface circuit of claim 1, wherein the slave network interface circuit interfaces between the slave modules using a Write/Read signal, an Address signal, a Write Data signal, and a Read Data signal.

3. The slave network interface circuit of claim 1, wherein the slave network interface circuit interfaces the On-Chip network using a SNI Address signal, a SNI data signal, a Write Address signal, a Write Data signal, a Read Address signal, and a Read Data signal.

4. The slave network interface circuit of claim 1, wherein the slave module interface signal includes an HREADY signal, an HRDATA signal, an HTRANS signal, an HWRITE signal, an HADDR signal, and an HWDATA signal;
    the HREADY signal is used by the slave module to inform the slave network interface that the slave module is not busy or that the HRDATA signal transmitted from the slave module is valid when the value of the HRDATA signal is '1', the HRDATA signal denotes data read from the slave module, the HTRANS signal denotes On-Chip network transmission modes, the HWRITE signal is used to read and write data at the slave module, the HADDR signal denotes an address to read or write data, and the HWDATA signal means data to be stored in the slave module, and
    wherein the HTRANS signal having the value of '00' denotes an idle mode, the HTRANS signal having the value of '01' denotes a busy mode, the HTRANS signal having the value of '10' denotes a Non sequential mode, the HTRANS signal having the value of '11' denotes a sequential mode, the HWRITE signal having the value of '1' means to write data at the slave module, and the HWRITE signal having the value of '0' means to read data from the slave module.

5. The slave network interface circuit of claim 1, wherein the slave network interface circuit further includes:
    a DEMUX for selecting whether all of data inputted from the On-Chip network through the backward path is outputted to a mode register or corresponding data is outputted to the MUX or the slave module; and
    the mode register for storing data transmission mode information to used by the SNI controller to control data transmission.

6. The slave network interface circuit of claim 5, wherein the DEMUX outputs input data from the On-Chip network to the mode register as a M_REG_DATA signal if a backward path address corresponding to the input data indicates a mode register address and outputs a mode register index part of the backward path address to the mode register as a M_REG_ADDR signal.

7. The slave network interface circuit of claim 5, wherein the DEMUX outputs lower 16 bits of input data from the On-Chip network if a backward path address does not indicate a mode register address, and outputs the input data to the anyone slave module as an HWDATA signal.

8. The slave network interface circuit of claim 5, wherein after the MUX receives a Read Address signal from the SNI controller and receives a Write Address signal from the DEMUX, the MUX outputs the Read Address, which is an address for storing HRDATA at the slave module, to the slave module if the MUX receives an HWRITE signal having a value of '0' from the SNI controller, and
    the MUX outputs the Write Address to the slave module as an HADDR signal if the MUX receives the HWRITE signal having a value of '1' from the SNI controller.

9. The slave network interface circuit of claim 5, wherein data transmission mode information stored in the mode register is structural information of a source memory stored data of the slave module, and includes a Start Address, a Transfer Size, a Transfer Gap, and an End Address; and
    the data transmission mode information is structural information of a destination memory storing data of the other slave module, and includes a Start Address, a Transfer Size, a Transfer Gap, and an End Address.

10. A slave network interface circuit for improving the parallelism of an On-Chip network, comprising:
    a MUX for selecting a Write Address inputted from the On-Chip network and a Read Address to read data from a slave module of a plurality of slave modules, which is inputted from a slave network interface (SNI) controller, in response to the control of the SNI controller, and inputting the selected address to the slave module; and the SNI controller for controlling writing and reading data at the slave module, and generating a Read Address to store data read from the slave module and to transfer to the On-Chip network;

wherein the slave network interface circuit transmits and receives data through a slave module interface signal, which is defined at an On-Chip network, between the slave modules, and transmits and receives the data through a forward path signal, which is transmitted from a slave network interface to the on-Chip network, and a backward paths signal, which is transmitted from the On-Chip network to the slave network interface, between the On-Chip network;

the backward path signal includes a BHOLDMNI signal, a BAEN signal, a BA signal, a BDEN signal, and a BDATA signal; and the BHOLDMNI signal is a signal for interrupting transmission of data received through a backward path, the BAEN signal denotes that the BA signal is valid, the BA signal denotes an address to store data, the BDEN signal denotes that the BDATA signal is valid, and the BDATA signal denotes data to be transmitted from the slave network interface to the slave module and stored in the slave module.

11. The slave network interface circuit of claim 10, wherein the slave network interface circuit interfaces between the slave modules using a Write/Read signal, an Address signal, a Write Data signal, and a Read Data signal.

12. The slave network interface circuit of claim 10, wherein the slave network interface circuit interfaces the On-Chip network using a SNI Address signal, a SNI data signal, a Write Address signal, a Write Data signal, a Read Address signal, and a Read Data signal.

13. The slave network interface circuit of claim 10, wherein the slave module interface signal includes an HREADY signal, an HRDATA signal, an HTRANS signal, an HWRITE signal, an HADDR signal, and an HWDATA signal;

the HREADY signal is used by the slave module to inform the slave network interface that the slave module is not busy or that the HRDATA signal transmitted from the slave module is valid when the value of the HRDATA signal is '1', the HRDATA signal denotes data read from the slave module, the HTRANS signal denotes On-Chip network transmission modes, the HWRITE signal is used to read and write data at the slave module, the HADDR signal denotes an address to read or write data, and the HWDATA signal means data to be stored in the slave module; and the HTRANS signal having the value of '00' denotes an idle mode, the HTRANS signal having the value of '01' denotes a busy mode, the HTRANS signal having the value of '10' denotes a Non-sequential mode, the HTRANS signal having the value of '11' denotes a sequential mode, the HWRITE signal having the value of '1' means to write data at the slave module, and the HWRITE signal having the value of '0' means to read data from the slave module.

14. The slave network interface circuit of claim 10, wherein the slave network interface circuit further includes:

a DEMUX for selecting whether all of data inputted from the On-Chip network through the backward path is outputted to a mode register or corresponding data is outputted to the MUX or the slave module; and the mode register for storing data transmission mode information to used by the SNI controller to control data transmission.

15. The slave network interface circuit of claim 14, wherein the DEMUX outputs input data from the On-Chip network to the mode register as a M_REG_DATA signal if a backward path address corresponding to the input data indicates a mode register address and outputs a mode register index part of the backward path address to the mode register as a M_REG_ADDR signal.

16. The slave network interface circuit of claim 14, wherein the DEMUX outputs lower 16 bits of input data from the On-Chip network if a backward path address does not indicate a mode register address, and outputs the input data to a slave module as an HWDATA signal.

17. The slave network interface circuit of claim 14, wherein after the MUX receives a Read Address signal from the SNI controller and receives a Write Address signal from the DEMUX, the MUX outputs the Read Address, which is an address for storing HRDATA at the slave module, to the slave module if the MUX receives an HWRITE signal having a value of '0' from the SNI controller, and the MUX outputs the Write Address to the slave module as an HADDR signal if the MUX receives the HWRITE signal having a value of '1' from the SNI controller.

18. The slave network interlace circuit of claim 14, wherein data transmission mode information stored in the mode register is structural information of a source memory stored data of the slave module, and includes a Start Address, a Transfer Size, a Transfer Gap, and an End Address; and the data transmission mode information is structural information of a destination memory storing data of the other slave module, and includes a Start Address, a Transfer Size, a Transfer Gap, and an End Address.

19. The slave network interface circuit of claim 10, wherein the slave network interface circuit is included in a slave network interface system improving the parallelism of the On-Chip network;

the slave network interface system includes a system controller for setting a memory controller on the On-Chip Network and internal registers in the slave network interface circuit, and the memory controller for controlling a memory for storing data; and the slave network interface circuit is disposed at each of the slave modules on the On-Chip network, is set a data transmission scheme of a corresponding slave module by setting the internal registers from the system controller, and is performed interfacing for data transmission between the corresponding slave module and the On-Chip network.

* * * * *